Feb. 26, 1957   C. D. FOSS   2,783,067
SEAL FOR JOURNAL BOX
Filed Oct. 12, 1953
FIG. 1.
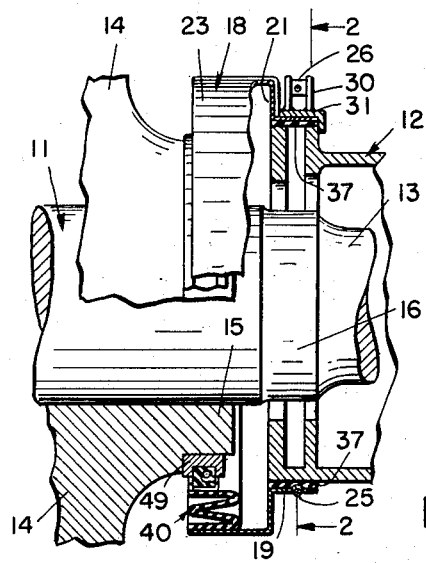
FIG. 2.
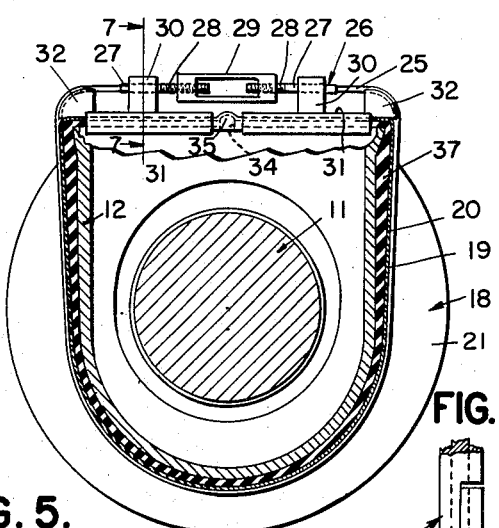
FIG. 9.
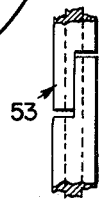
FIG. 3. FIG. 5. FIG. 4.
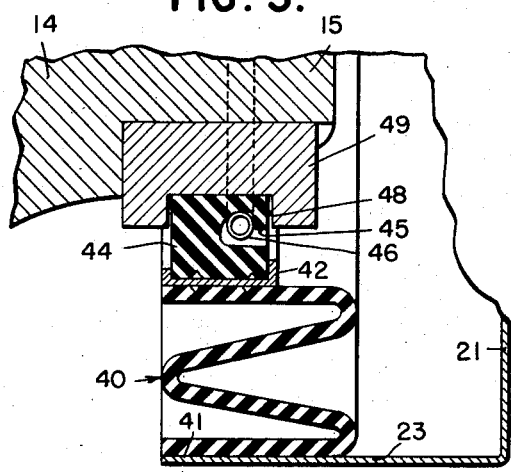
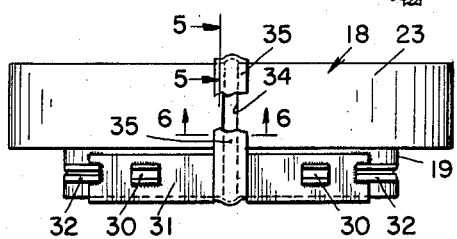
FIG. 8.
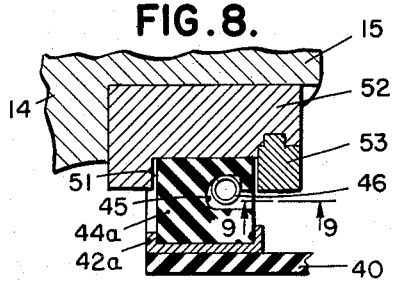
FIG. 7. FIG. 6.
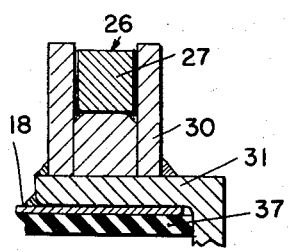
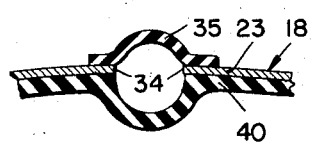
INVENTOR
CURTIS D. FOSS
BY
Mason & Graham
ATTORNEYS United States Patent Office 2,783,067
Patented Feb. 26, 1957

2,783,067
SEAL FOR JOURNAL BOX
Curtis D. Foss, Los Angeles, Calif.
Application October 12, 1953, Serial No. 385,414
5 Claims. (Cl. 286—11)

This invention has to do with means for effecting a seal between relatively rotatable parts and particularly with means for effecting a seal between a railway car journal box and the car axle.

Various seal means have been devised and used in railway car journal boxes in an attempt to provide a fluid-tight seal between the box and the car axle.

The problem of maintaining a seal is a difficult one because of the limited area of axle area available against which to seal and the very substantial axial and radial movements of the axle relative to the journal box.

An object of my invention is to provide a novel seal means for railway car journal boxes which provides a seal between the car journal box and the car wheel mounted on the axle adjacent to the journal box thereby overcoming many of the difficulties encountered when it is attempted to effect a seal between the box and the axle itself.

Another object of the invention is to provide a seal which is extremely flexible to accommodate for substantial relative radial and axial movements of the parts between which it effects a seal.

A still further object of the invention is to provide a seal construction of the type indicated embodying a housing which acts as a guard for protecting and enclosing portions of the seal which might be subject to damage from flying objects or from acts of vandalism.

A still further object is to provide a seal construction which can be readily installed.

These and other objects will be apparent from the drawings and the following description thereof.

Referring to the drawings:

Fig. 1 is a sectional view through the inner end of a journal box showing the car wheel and axle fragmentarily and showing seal means embodying the invention;

Fig. 2 is cross-sectional view on line 2—2 of Fig. 1;

Fig. 3 is a fragmentary enlarged sectional view in the plane of Fig. 1 of a portion of the seal means shown therein;

Fig. 4 is a plan view of the seal structure with the turnbuckle and the clamping wire removed;

Fig. 5 is a fragmentary enlarged sectional view on line 5—5 of Fig. 4;

Fig. 6 is an enlarged fragmentary sectional view on line 6—6 of Fig. 4;

Fig. 7 is an enlarged sectional view on line 7—7 of Fig. 2;

Fig. 8 is a sectional view similar to Fig. 3 showing a modified construction; and Fig. 9 is a fragmentary edge view of the retaining ring on line 9—9 of Fig. 8.

More particularly describing the invention, numeral 11 generally indicates the axle of a railway car or the like and 12, the journal box. The axle has a reduced, bearing-engaging portion 13 which projects into the journal box and is conventionally supported against the bearing (not shown). A car wheel 14 having a hub portion 15 is fixedly mounted on the axle in such a manner that no space exists between the parts for passage of fluid. It is a particular feature of my invention that I provide a seal between the journal box 12 and the wheel thereby overcoming the various difficulties which are encountered when an attempt is made to seal against the surface 16 of the car axle as is conventionally done.

I provide a housing 18 which includes a mounting flange 19 shaped to correspond to the outer surface 20 of the journal box. The housing includes an intermediate radially extending portion 21 and a cylindrical main portion 23 extending axially therefrom which overlies a portion of the hub 15 of the car wheel, being spaced radially outwardly thereof.

The mounting flange 19 of the housing is securely attached to the journal box by means of a clamp means which includes a wire or wire rope 25, the ends of which are each fitted with an element 26 having a non-circular, rectangular portion 27 and a threaded end portion 28 to receive a turnbuckle nut 29, the member 25 being reversely threaded so that a turnbuckle action is obtained. Channel-shaped lug means 30 on plates 31 welded to the top of the housing receive the portions 27 of members 26 and grooved blocks 32 act as guides for the wire rope 25. The housing is split at 34 across its top and the split is covered by a flexible closure such as a strip of synthetic rubber 35 or the like, bonded to the housing. Beneath the housing portion 19 is mounted a resilient gasket 37 which may be of synthetic rubber.

Within the portion 23 of the housing I provide an accordion-like seal ring supporting member 40 which is preferably bonded to the inner surface of portion 23 of the housing at 41. Member 40 carries a mounting ring 42 of channel shape in cross section and the ring 42 is preferably bonded to the member 40. The mounting ring 42 supports a resilient sealing ring 44 of synthetic rubber or the like, the ring being shown as substantially rectangular in cross section and having a lateral recess 45 therein containing a helically coiled spring member 46 serving to resiliently constrict the inner portion of the ring.

The seal ring 44 is received in a groove 48 formed in a seal bearing member 49 which is provided on the hub 15, the member 49 being shrunk onto the hub or otherwise securely attached thereto.

It will be apparent that the above-described seal means provides an effective seal between the car wheel and the axle on the one hand and the journal box on the other. The housing 18 not only serves to support the flexible resilient portions of the seal but also serves as a guard therefor to protect the same from flying stones and from vandals. In the installation of the seal, the seal assembly is first applied to the car wheel with the axle and journal box separated to permit this. This is accomplished by first expanding the seal ring 44 and locating it in the groove 48 in seal bearing member 49. The ring 42 may then be forced over the seal ring. Subsequently the axle is moved into and mounted in the journal box and the housing 18 secured to the journal box.

In the form of the invention thus far described the seal ring 44 is not bonded to the ring 42. However, I contemplate that this may be desirable in some cases, and in Fig. 8 a construction is shown wherein the seal ring 44a is bonded to a mounting ring 42a. To enable the positioning of the seal ring 44a in the groove 51 in the seal bearing member 52, I provide a removable split retaining ring 53 in the seal bearing member which defines the outer limits of the groove.

Although I have illustrated and described a preferred form of my invention, I contemplate that various changes and modifications can be made without departing from

I claim:

1. Means for effecting a seal between a journal box and an axle projecting from an end thereof and having a wheel thereon beyond the box in fluid-tight engagement with the axle, said wheel having a hub projecting toward said box, said means comprising an annular housing detachably mounted on the journal box and extending axially toward said wheel and surrounding a portion of the hub thereof, a ring of metal on the hub of the wheel having a peripheral groove providing a seal bearing surface, a seal ring resiliently engaging said surface, and flexible, impervious seal ring supporting means between said seal ring and said housing.

2. Means for effecting a seal between a journal box and an axle projecting from an end thereof and having a wheel thereon beyond the box in fluid-tight engagement with the axle, said wheel having a hub projecting toward said box, said means comprising a substantially rigid housing split axially from end to end and including a cylindrical portion surrounding said hub, a flexible, impervious connecting wall member bonded to the edges of the housing marginal to said split, and a mounting flange shaped to substantially fit the radially outermost portion of the end of the journal box adjacent said wheel, means detachably securing said mounting flange to said box, means on the hub of the wheel providing a seal bearing surface, a seal ring resiliently engaging said surface, and flexible, impervious seal ring supporting means between said seal ring and said housing attached to said housing.

3. A construction as set forth in claim 2 in which the means for detachably securing the mounting flange to the box comprises an elongated member encircling said mounting flange and means for tightening said elongated member.

4. Means for effecting a seal between a journal box and an axle projecting from an end thereof and having a wheel thereon beyond the box in fluid-tight engagement with the axle, said wheel having a hub projecting toward said box, with a seal bearing surface on the hub, said means comprising a substantially rigid, annular housing member having a cylindrical portion surrounding said hub and having a mounting flange shaped to fit the radially outermost portion of the end of the box, a gasket between said mounting flange and said box, said housing member being split axially from end to end, a flexible impervious wall joining the edges of the split, an elongated member encircling said mounting flange, means for tightening said elongated member about said mounting flange, a resilient seal ring engaging said seal bearing surface on the hub, a rigid mounting ring surrounding said seal ring, and an accordion-like elastic wall extending between and attached to the cylindrical portion of the housing member and said mounting ring.

5. Seal means as set forth in claim 4 in which the seal bearing surface on said hub comprises a ring of metal having a peripheral groove, said seal ring being received in said groove.

References Cited in the file of this patent

UNITED STATES PATENTS

| | | |
|---|---|---|
| 2,251,760 | Schantz et al. | Aug. 5, 1941 |
| 2,391,159 | Hermansen | Dec. 18, 1945 |
| 2,593,219 | Thomas | Apr. 15, 1952 |
| 2,649,316 | Beezley | Aug. 18, 1953 |
| 2,714,046 | Barber | July 26, 1955 |

FOREIGN PATENTS

| | | |
|---|---|---|
| 473,709 | Great Britain | Oct. 19, 1937 |
| 711,849 | Germany | Oct. 8, 1941 |
| 944,434 | France | Nov. 2, 1948 |